Patented May 13, 1930

1,758,500

UNITED STATES PATENT OFFICE

WILLIAM W. CHRISTMAS, OF RIDGEFIELD PARK, NEW JERSEY, ASSIGNOR OF ONE-THIRD TO C. C. HINES, OF WASHINGTON, DISTRICT OF COLUMBIA

CASEIN CONTAINING PLASTIC COMPOSITION

No Drawing. Application filed June 9, 1924. Serial No. 719,004.

This invention relates to a new and useful plastic composition which may be molded or pressed into desirable shapes for a variety of uses, and which may be shaped or dressed with tools.

One object of the invention is to provide a plastic composition which may be cheaply prepared, and which may be molded or pressed into a variety of shapes to produce a finished article such as mouldings, picture frames, billiard balls, objects of art, exposed ornamental objects, decorations, benches, etc., and which may also be applied by spreading with a trowel or the like to form floors, walls, or like surfaces;

A further object is to provide a material which will not warp, check, or crack under the usual weather and temperature conditions, which is highly water resistant, and which will hold a coat of paint or varnish.

A further object is to provide a material to which may be given a high polish, which may be stained either during the manufacture or after the material has been produced, and which may be drilled and shaped by suitable tools;

A further object is to produce a material which will withstand a considerable increase in temperature without burning or disintegrating, and which may be used as a fireproof coating to combustible structures;

A further object is to provide a material which when applied in a soft plastic state to such surfaces as wood, brick, stone, concrete, and similar materials has the property of penetrating such surfaces and combining therewith producing a very strong bond, and which, after proper setting and hardening, can only be separated therefrom with considerable difficulty;

A further object is to provide a material, which when applied in a soft plastic state, will serve as bond between similar or dissimilar surfaces, and produce a watertight and weather-proof joint;

A further object is to provide a material that may be used for tiling in decorating stores, halls, washrooms, and similar places, and that because of its imperviousness to water, is highly sanitary; and that may be mixed with stains or colors, or pieces of colored glass or stone during its manufacture, and used as mosaics or similar decorative surfaces;

A further object is to provide a material which is an electric insulator, and may be used for moisture-proof heat-resisting supports for electrical devices, and in which metallic pieces may be embedded during its manufacture and produce an integral article, such as a switch-base or certain types of electrical fittings having the metal contacts immovably secured in place;

A further object is to produce a plastic composition for general use which has the combined properties of being a water-resistant, heat-resistant, and an electrical insulator, that may be molded or pressed into a variety of shapes, that may be drilled, cut, and otherwise worked, and that is not readily fragile.

In producing this composition, powdered casein is mixed with a hydrated alkaline earth substance such as dry calcium hydroxid powder, and further mixed with powdered calcium carbonate, either natural, or as obtained as a by-product in some industries, whiting, marble dust, sand, fuller's earth, asbestos, ground oyster shells, or other material which can be used as a filler; there is also added a small quantity of glacial acetic acid, and a fibrous material such as sawdust or wood flour, or suitably disintegrated wood pulp for a body. I may also add calcium stearate, or similar alkaline earth salt of a fatty acid which has the property of increasing its water-resistance, and in this case I may reduce or omit the glacial acetic acid.

The following proportions have been found to produce an excellent plastic composition, having the desirable qualities above enumerated. Minor changes of the quantities do not affect the result, and are within the scope of the invention.

| | |
|---|---|
| Powdered casein | 1 pound |
| Powdered calcium hydroxid | 1 pound |
| Calcium carbonate or whiting | 1 pound |
| Marble dust, sand, fuller's earth, asbestos, ground oyster shells, or other fillers, singly or mixed | 3 pounds |
| Glacial acetic acid | ½ ounce |
| Sawdust, wood flour, or powdered wood pulp | 3 pints |
| Water in sufficient quantity to produce a free flowing mass. | |

The following may also be used:

| | |
|---|---|
| Powdered casein | 1 pound |
| Powdered calcium hydroxid | 1 pound |
| Calcium carbonate or whiting | 1 pound |
| Marble dust, sand, fuller's earth, asbestos, ground oyster shells, or other filler, singly or mixed | 3 pounds |
| Powdered calcium stearate | 1 ounce |
| Sawdust, wood flour, or powdered wood pulp | 3 pints |
| Water in sufficient quantity to produce a free flowing mass. | |

The compounding of the ingredients is effected as follows:—

The casein is soaked in water; the powdered calcium hydroxide is mixed with water, and the calcium carbonate or whiting is mixed with acidulated water, namely, a solution of water and acetic acid, the former in quantity sufficient to thoroughly saturate the whiting and the latter in the quantity hereinbefore stated. The calcium hydroxide and water mixture is then added to the wet casein and thoroughly mixed, after which the calcium carbonate or whiting and acid mixture is added, and the resulting mass thoroughly mixed; the marble dust or other filler, or mixture of fillers, is then added, and the sawdust or wood flour finally added just before using. After the addition of each component, the mass is thoroughly mixed to insure a uniform distribution of each ingredient, and stirring should be continued until all free carbon dioxide is removed. Any suitable coloring matter, such as a dye or stain may be added before or after the addition of the filler, or the filler may consist, in part, of such coloring matter, for example, paint colors, lamp black, etc. Before the addition of the sawdust, sufficient water should have been present to prevent premature setting, and to provide a sufficiently fluid mixture to enable the thorough distribution of the sawdust, and produce a dough-like plastic mass. The sawdust should not be added until just before using. The thoroughly mixed mass may be applied with a trowel to different types of surfaces, or may be added to molds under varying degrees of pressure; or may be passed through rolls or dies to produce objects of different shapes, such as mouldings, panels, etc., or be applied as a coating to other articles, to render them water- and fire-resistant.

The composition containing the calcium stearate, either with or without acetic acid, is prepared in the same manner as the acetic acid composition, except that, in the absence of acetic acid, there will be no evolution of carbon dioxide. The final composition will have substantially the same properties.

The casein and calcium hydroxide together form a casein glue, and this is thoroughly disseminated throughout the mass of the plastic. During the drying process, which may take place slowly or rapidly, an induration of the casein glue sets in, which tenaciously binds its component parts, and the surfaces to which it has been applied in a uniformly dense and hard mass, which strongly resists fracture, or separation from the surface to which it has been applied. By suitable pressure, or other treatment, a high polish may be given to the articles produced, and coatings of various colors may be baked upon it, as in the well known japan and enamel coating processes.

The use of calcium carbonate (whiting) in this composition, with or without the acetic acid, is of importance, as it acts to greatly increase the adhesiveness (tenacity) of the casein glue. The use of acetic acid in combination with the whiting, whereby a certain proportion of calcium acetate is formed, adds to this action, that is to say, further increases the tenacity of the glue, providing a composition which will stick to wood, glass, concrete and other dissimilar surfaces so firmly as to practically render it an inseparable part of the material to which it is applied. While the use of calcium carbonate is preferred, I reserve the right to use any other calcium salt or compound having an equivalent action.

In this composition the marble dust, sand, fuller's earth, asbestos, ground oyster shells, and sawdust, singly or mixed, serve as fillers, any number or all of which may be used within the scope of my invention.

Having thus fully described my invention, I claim:—

1. The method of making a plastic composition, which comprises combining casein with an alkaline earth hydroxid to produce a casein glue, mixing therewith a product from a combination of calcium carbonate and acetic acid, and then incorporating therewith an inorganic filler and an organic fibrous filler.

2. The method of making a plastic composition which comprises combining casein with an alkaline earth hydroxid to produce a casein glue, mixing therewith the product from a combination of calcium carbonate, acetic acid and calcium stearate, and then incorporating therewith an inorganic filler and an organic fibrous filler.

3. The method of making a plastic composition, which comprises combining casein with calcium hydroxid to produce a casein glue, mixing therewith the product of reaction from a combination of calcium carbonate and acetic acid, and then incorporating therewith an inorganic filler and an organic fibrous filler.

4. A plastic composition resulting from the combination of casein, an alkaline earth hydroxid, calcium carbonate, acetic acid, an inorganic filler, and an organic fibrous filler.

5. A plastic composition resulting from the combination of casein, an alkaline earth hydroxid, calcium carbonate, acetic acid, calcium stearate, an inorganic filler, and an organic fibrous filler.

6. A plastic composition resulting from the combination of casein, calcium hydroxid, calcium carbonate, acetic acid, an inorganic filler, and an organic fibrous filler.

7. A plastic composition resulting from the composition of powdered casein 1 pound, powdered calcium hydroxid 1 pound, calcium carbonate 1 pound, acetic acid ½ ounce, an inorganic filler 3 pounds, an organic fibrous filler 3 pints, and water in sufficient quantity to form a flowing mass.

In testimony whereof I affix my signature.

WILLIAM W. CHRISTMAS.